Figure 1:
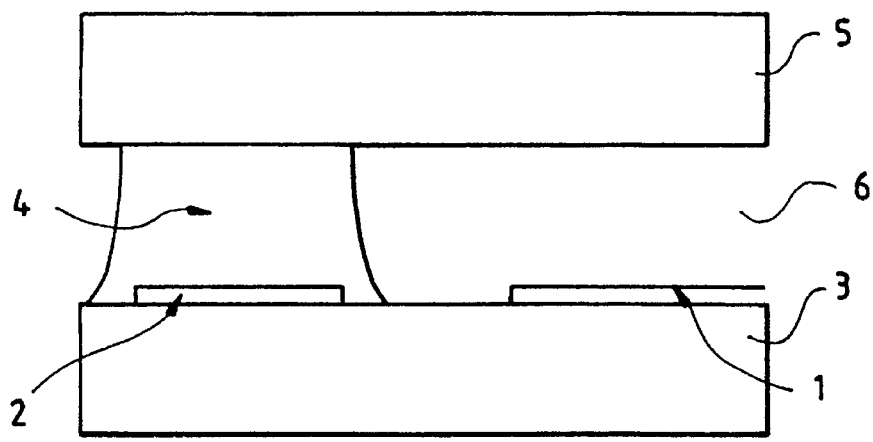

United States Patent [19]

Lebrun et al.

[11] Patent Number: 5,606,194
[45] Date of Patent: Feb. 25, 1997

[54] DEVICE FOR ENCAPSULATING AND PASSIVATING A CIRCUIT FOR FLAT SCREENS

[75] Inventors: Hugues Lebrun, La Tronche; Laurence Mulatier, Varces, both of France

[73] Assignee: Thomson-LCD, Puteaux, France

[21] Appl. No.: 351,408

[22] PCT Filed: Jun. 25, 1993

[86] PCT No.: PCT/FR93/00641

§ 371 Date: Feb. 10, 1995

§ 102(e) Date: Feb. 10, 1995

[87] PCT Pub. No.: WO94/00795

PCT Pub. Date: Jan. 6, 1994

[30] Foreign Application Priority Data

Jun. 26, 1992 [FR] France ................................ 92 07887

[51] Int. Cl.$^6$ .................................................. H01L 31/0203
[52] U.S. Cl. .............................. 257/433; 257/432; 349/110
[58] Field of Search ..................................... 257/432, 433, 257/434, 202, 678, 98, 99; 359/67, 59

[56] References Cited

U.S. PATENT DOCUMENTS 5,132,830  7/1992  Fukutani et al. .......................... 359/67
5,185,653  2/1993  Switky et al. ............................ 257/729
5,299,041  3/1994  Morin et al. ............................... 359/67
5,539,552  7/1996  Desai et al. ................................ 359/67

FOREIGN PATENT DOCUMENTS 0226997  1/1987  European Pat. Off. .

Primary Examiner—Mahshid D. Saadat
Assistant Examiner—S. V. Clark
Attorney, Agent, or Firm—Oblon, Spivak, McClelland, Maier & Neustadt, P.C.

[57] ABSTRACT

A device for encapsulating and passivating integrated control circuits of flat screens. A sealing bead is placed on a substrate plate in order to encapsulate and passivate an integrated control circuit mounted on the plate. In one embodiment, the sealing bead is placed directly on top of the control circuit. In a second embodiment, the sealing bead is placed on both sides of the circuit so as to form a chamber which is separate from that which contains the active matrix. In a third embodiment, an opaque material is also placed on top of the circuit which acts as a spacer and may also act as a "black matrix".

8 Claims, 2 Drawing Sheets

DEVICE FOR ENCAPSULATING AND PASSIVATING A CIRCUIT FOR FLAT SCREENS

The subject of the present invention is a device for encapsulating and passivating circuits, and especially flat-screen integrated control circuits.

A liquid-crystal flat screen consists of a certain number of electro-optical cells/transducers consisting of electrodes framing a liquid crystal, the optical properties of which are modified depending on the value of the field to which it is subjected and which are controlled by a switching device. Each of these elementary cells thus constituted is called a pixel.

The addressing of these pixels is performed by means of rows (selection lines) and of columns (data lines) driven by peripheral addressing circuits (also called drivers).

The electrodes, the switching devices, the rows and the columns are deposited and etched on the same substrate plate; they constitute the active matrix of the screen. Advantageously, the peripheral control circuits may themselves also be integrated onto the substrate plate including the active matrix. The problem of passivating and protecting them is then posed.

In fact, these devices are fragile and their reliability is achieved by effective protection against all types of attack which may modify their electrical behaviour. These attacks may be mechanical, due to impacts or scratches, chemical when, for example, the screen is cleaned with an organic solvent or an alcohol, or electrical when, for example, a polar water, alcohol or liquid crystal molecule introduces a stray capacitance into the circuit. Light is another type of attack which can modify the operation of a circuit by photoconductivity.

In a general way, the passivation of integrated circuits is achieved by a dual layer consisting of silicon nitride (SiN) isolating the active layers, and of a metal or of an opaque organic polymer of the polyimide type which protects them from the light and, in the case of active matrices of flat screens, calibrates the cavity in which the liquid crystal is placed. In this latter case, the support plate including the active matrix and the backing plate constituting the backing electrode are bonded to one another by means of a sealing bead generally of epoxy which also makes it possible to keep the liquid crystal within the cells. This type of device is described in detail in the patent application EP 0444621 from Casio.

The present invention makes it possible to optimize the passivation and the protection of electronic circuits produced on a substrate, by virtue of a judicious use of this sealing bead, and is particularly well adapted to that of the addressing circuits integrated on glass for active-matrix flat screens.

The present invention relates to a device for encapsulating and passivating electronic circuits produced on a substrate plate including a sealing bead, characterized in that this bead is used to passivate and protect these electronic circuits.

The present invention also relates to a device for encapsulating and passivating electronic circuits produced on a support plate on which an active matrix is also produced controlling electro-optical cells and including an opaque layer blocking the photoconductivity of the components of the active matrix performing the function of spacer and possibly that of "black matrix", which is characterized in that this layer is used for encapsulating and passivating the said electronic circuits.

This type of encapsulation and of passivation makes it possible to minimize the surface lost at the periphery of the active part of the screen without complicating the fabrication process in order to do so.

Figure 2:
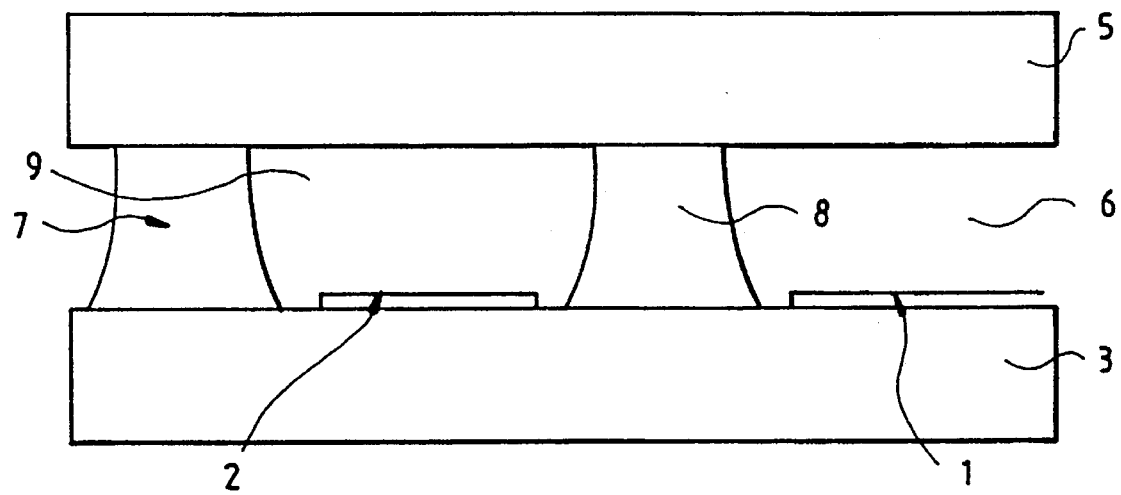
Figure 3:
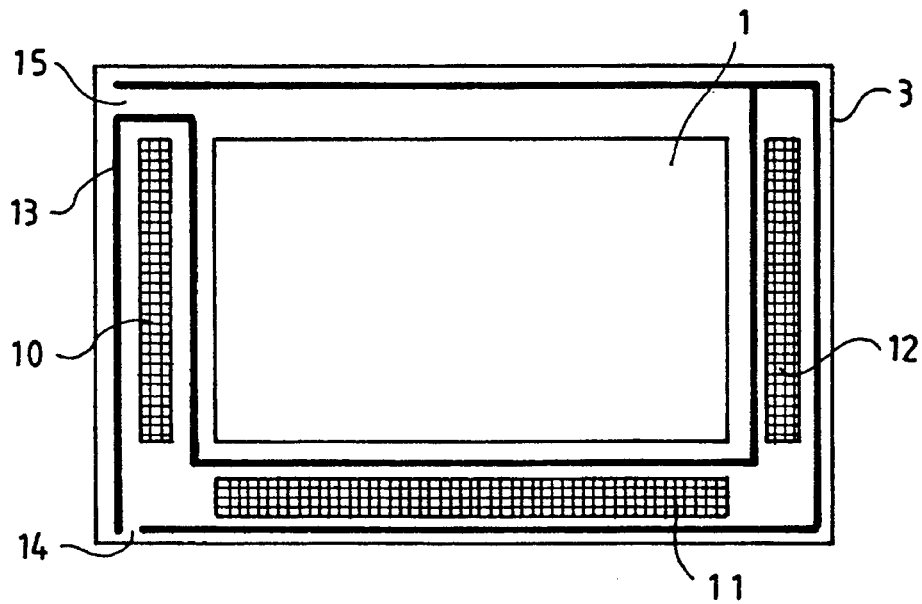
Figure 4:
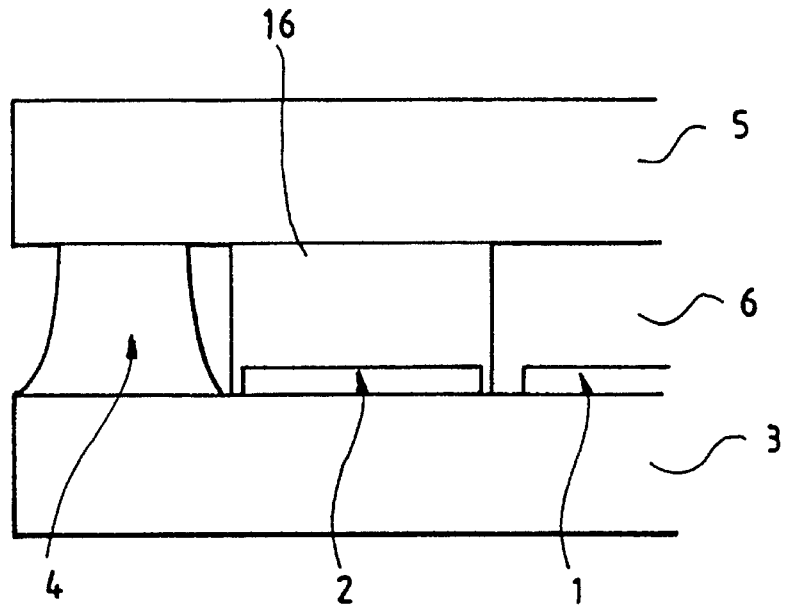
Figure 5:
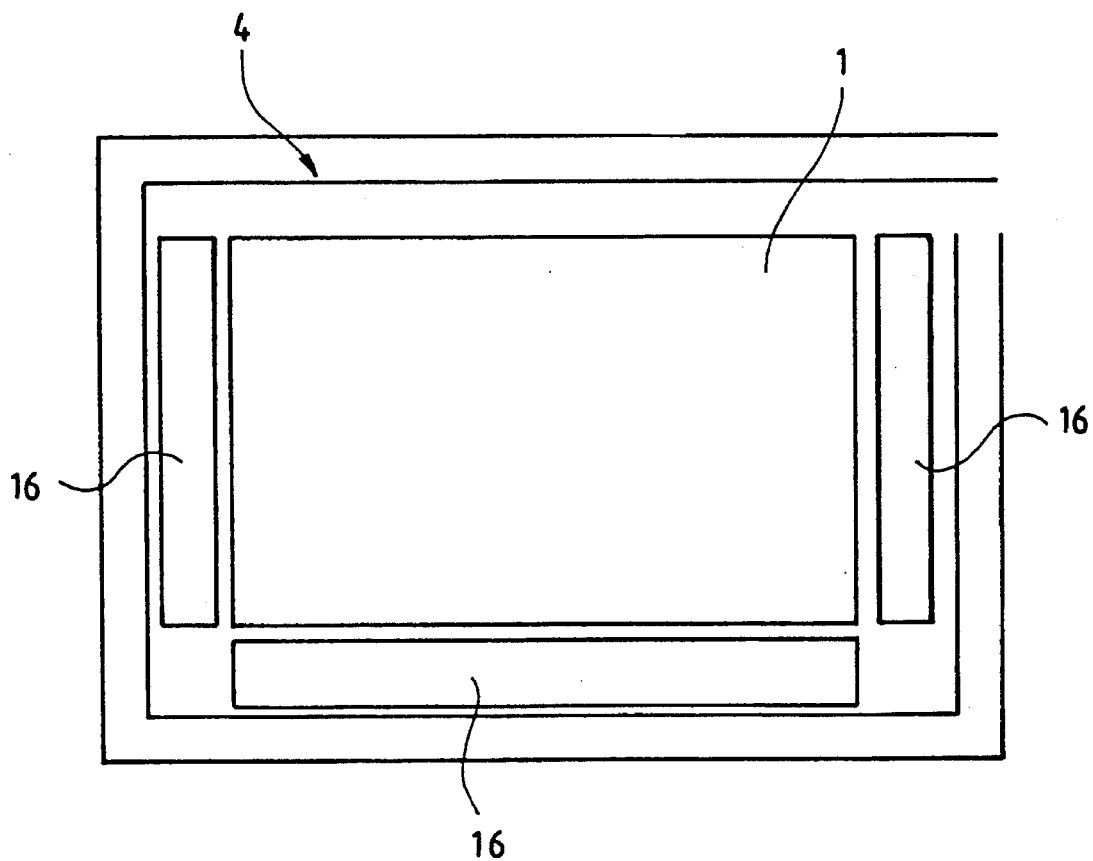

The present invention will be better understood and additional advantages will appear in the description which will follow, illustrated by the following Figures:

FIG. 1 represents a sectional view of a liquid-crystal screen according to a first embodiment of the invention, FIG. 2 represents a sectional view of a liquid-crystal screen according to a second embodiment of the invention, FIG. 3 represents a plan view of a liquid-crystal screen equipped with a particular device of the second embodiment, FIG. 4 represents a sectional view of a liquid-crystal screen according to a third embodiment of the invention, and FIG. 5 represents a plan view of a liquid-crystal screen equipped with a particular device according to the third embodiment of the invention.

In the first place, the substrate plate not yet treated is passivated in a conventional way, such as, for example, with a layer of silicon nitride. This plate is made of transparent material (such as for example glass, quartz or plexiglass) in the case of a light-transmitting mode (such as for projection screens), but can, obviously, be of any other material in the context of a reflective mode.

In the type of screen in which we are interested, the peripheral addressing circuits (drivers) are produced at the same time and with the same materials as the active matrix. Such types of screens are described in the French patent application No. 87 03737 of Hosidem Electronics, or also in the French patent No. 87 07941 of THOMSON-CSF. The invention consists in using the sealing bead of the two plates to protect these integrated drivers. This bead may be opaque or transparent.

In FIGS. 1, 2, 3, 4 and 5 the identical elements have the same indexing.

In FIG. 1, the active matrix 1 and the integrated addressing circuit 2 have been deposited and etched on the plate 3. Usually, the sealing bead of the screen is arranged between the active matrix 1 and the addressing circuit 2 so as to keep a calibrated spacing between the plates 3 and 5, delimiting a region containing the liquid crystal. In the invention, the bead 4 completely covers the addressing circuit 2 and delimits a region 6 containing the liquid crystal. For these circuits, this bead, in addition to a spacer, therefore constitutes a passivation layer against the mechanical, chemical and electrical attacks, and their electrical behaviour is therefore perfectly preserved.

Moreover, this embodiment makes it possible to minimize the space lost at the periphery of the useful part of the screen, since the addressing electronics, usually outside the bead, are now found under the bead and therefore do not require additional space.

This sealing bead may be obtained by using hot-polymerized epoxy or epoxy polymerized under ultraviolet (acrylic materials, glues). In any case, during deposition of the bead, an opening which will be closed off at the end of the process is formed so as to release the gas trapped in the enclosure and make it possible to fill this enclosure with liquid crystal in the case of a liquid-crystal screen. The nature of this gas (air, nitrogen, argon or any type of inert gas) depends upon the atmosphere in which the operation is carried out. An opaque material may be used for producing this bead, so as to block the photoconductivity of the drivers.

A second embodiment using the same materials for the sealing bead is presented in FIG. 2. In this Figure, the sealing bead of the plates 3 and 5 is deposited on either side (elements 7 and 8) of the addressing circuit 2 so as to obtain a perfectly sealed enclosure 9. In this case, the sealing bead must never touch the integrated circuits, at the cost of locally modifying their characteristics, that is to say that the electrical properties of the materials used in the integrated circuits will not be equal in the regions covered over or touched by the sealing bead and the regions not covered over; this would result in a malfunctioning of the functions of the circuits.

In the same way as in the first embodiment of the invention, an opening is formed in the sealing bead so as to release the gas trapped in the enclosure. At the end of the encapsulation operation, the enclosure 9 containing the driver is then perfectly sealed.

FIG. 3 represents a plan view of a flat screen including a sealing bead structure according to the second embodiment of FIG. 2. On a plate 3, the active matrix 1 and the integrated drivers 10, 11 and 12 are produced. The sealing bead 13 of the type set out above is deposited around the driver, leaving an aperture 14 allowing the gas to escape from the enclosure thus delimited. In this particular case, the screen includes three integrated drivers 10, 11 and 12 on three sides, and, on the fourth side, the bead fulfils its conventional function which is to trap the liquid crystal between the two plates, while leaving an opening 15 for the same reasons as those set out above (filling of the liquid crystal).

The protection and the passivating of the integrated row and column addressing circuits of a screen may be carried out both with the bead on the drivers (first embodiment) and with the bead around the drivers (second embodiment). That is to say that it is possible, for example, to passivate the various rows of a screen with the first embodiment and the various columns of this same screen with the second, or conversely.

So as to maintain a perfectly identical space between the plates in the region of the bead over the whole surface of the screen, spacers can be inserted into the region of the bead. These spacers are balls of calibrated diameter which are incorporated into the bead before it is deposited, or a stack of layers of a calibrated thickness produced at the same time as the active matrix in the course of the process of assembling the screen.

It can happen then that the deposition of the bead directly onto the drivers creates problems of adhesion or damages the drivers; a third embodiment of the invention makes it possible to avoid this type of problem.

In fact, in parallel with this type of spacer bead, LBL (for Light Blocking Layer) layers are used on the components and the connections of the active matrix, which play the role of optical mask by blocking the photoconductivity of the active matrix, of spacer for the liquid-crystal cell and possibly of black mask (also called Black Matrix) so as to enhance the contrast of the screen.

The third embodiment of the invention represented in FIGS. 4 and 5 then consists in using these LBL layers 16 in order, in addition to the preceding functions, to passivate and protect the integrated drivers 2, the sealing bead 4 then being situated on the outside of the active matrix 1 and the integrated peripheral drivers 2 passivated and protected by the LBL layers 16. With the LBL being used for fabricating liquid-crystal cells, the deposition of it onto the integrated drivers forms part of the fabrication process itself and is therefore very simple and inexpensive to implement.

Moreover, the adhesion of the bead 4 to the plate 3 is better since the latter is no longer deposited onto metal, isolating or semiconducting layers but onto the support plate 3 itself (generally made of glass) at the required distance (of the order of 1 mm or less) from the LBL 16 deposited on the integrated peripheral drivers 2 and the active matrix 1.

Obviously, this third embodiment is not limited to screens including spacer beads but to all types of beads and of LBL.

In FIG. 5 a particular screen is represented, since it includes three integrated drivers at the periphery of the active matrix 1, which are passivated and protected by LBL layers 16.

The three different embodiments of the invention may be combined together on the same screen.

This invention also applies to screens having only a single type (row or column) of integrated addressing circuit.

Moreover, the semiconductor material used for producing the active matrix and the integrated addressing circuits may be amorphous or polycrystalline silicon or cadmium selenide (CdSe). The basic component may be a transistor or a diode.

The present invention applies to all types of flat screens with integrated addressing circuits, such as liquid-crystal screens using electrically controlled birefringence, the twisted nematic mode or the ferroelectric mode, or also plasma screens.

We claim:

1. Device for encapsulating and passivating electronic circuits, comprising:
   a substrate plate;
   an electronic circuit mounted on said substrate plate;
   an active matrix mounted on said substrate plate; and
   a sealing bead deposited on said substrate plate and surrounding said electronic circuit so as to form a sealed enclosure separate from said active matrix.

2. A device for encapsulating and passivating electronic circuits, comprising:
   a substrate plate;
   an electronic circuit mounted on said substrate plate for controlling electro-optical cells;
   an active matrix controlling electro-optical cells mounted on said substrate plate;
   an opaque layer covering said electronic circuit so as to block the photoconductivity of the active matrix, to function as a spacer and a "black matrix";
   wherein said opaque layer is used to encapsulate and passivate the electronic circuit.

3. Device for encapsulating and passivating electronic circuits, comprising:
   a substrate plate;
   an electronic circuit mounted on said substrate plate for controlling electro-optical cells;
   an active matrix mounted on said substrate plate;
   an opaque layer covering said electronic circuit to block the photoconductivity of the active matrix, to function as a spacer and a "black matrix"; and
   a sealing bead deposited around the electronic circuit so as to form a sealed enclosure separate from the active matrix.

4. Device for encapsulating and passivating electronic circuits according to claim 2, characterized in that the encapsulating and passivating layer is deposited on the circuits and covers them completely.

5. Device for encapsulating and passivating electronic circuits according to one of claims 4 and 1–3, characterized in that the electronic circuit is an integrated addressing circuit of an active matrix of a liquid-crystal or plasma screen.

6. Device for encapsulating and passivating electronic circuits according to one of claims 4 and 1–3, characterized in that the substrate plate on which the electronic circuits are produced is made of transparent material.

7. Device for encapsulating and passivating electronic circuits according to one of claims 4 and 1–3, characterized in that the basic component used in the electronic circuit or circuits is a transistor or a diode.

8. Device for encapsulating and passivating electronic circuits according to one of claims 4 and 1–3, characterized in that the electronic circuit is made of amorphous or polycrystalline silicon or cadmium selenide.

* * * * *